United States Patent
Yu

(10) Patent No.: US 9,652,555 B2
(45) Date of Patent: *May 16, 2017

(54) COMPUTING ARCHITECTURE FOR STORING A GRAPH DATABASE BASED ON TEMPORAL ASPECTS OF ITS EDGES

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,444

(22) Filed: Nov. 8, 2015

(65) Prior Publication Data

US 2016/0063133 A1   Mar. 3, 2016

Related U.S. Application Data

(63) Continuation of application No. 14/011,986, filed on Aug. 28, 2013, now Pat. No. 9,218,438.

(51) Int. Cl.
*G06F 17/30* (2006.01)

(52) U.S. Cl.
CPC .. *G06F 17/30958* (2013.01); *G06F 17/30979* (2013.01)

(58) Field of Classification Search
None
See application file for complete search history.

(56) References Cited

U.S. PATENT DOCUMENTS

| | | | | |
|---|---|---|---|---|
| 7,792,868 B2* | 9/2010 | Finkelstein | ....... | G06F 17/30873 707/737 |
| 8,073,821 B2* | 12/2011 | Zahavi | ............... | G06F 11/3476 345/440 |
| 8,180,804 B1* | 5/2012 | Narayanan | ........ | G06F 17/30867 707/798 |
| 8,185,558 B1* | 5/2012 | Narayanan | ........ | G06F 17/30958 707/798 |
| 8,244,772 B2* | 8/2012 | Aasman | ............ | G06F 17/30241 707/797 |

(Continued)

OTHER PUBLICATIONS

Angles, Renzo. "A comparison of current graph database models." In Data Engineering Workshops (ICDEW), 2012 IEEE 28th International Conference on, pp. 171-177. IEEE, 2012.

(Continued)

*Primary Examiner* — Farhan Syed
(74) *Attorney, Agent, or Firm* — Banner & Witcoff, Ltd.; Michael A. Springs

(57) ABSTRACT

Data specifying a new edge of a graph database may be received. A data store for storing the new edge may be identified from amongst a plurality of data stores utilized to store one or more portions of the graph database. Each of the plurality of data stores may be associated with a set of values corresponding to an aspect of edges of the graph database. The data store for storing the new edge may be identified based on the new edge being associated with a value corresponding to the aspect of edges of the graph database that is within a set of values corresponding to the aspect of edges of the graph database associated with the data store for storing the new edge.

15 Claims, 5 Drawing Sheets

(56) References Cited

U.S. PATENT DOCUMENTS

| | | | | |
|---|---|---|---|---|
| 8,396,884 | B2* | 3/2013 | Singh | G06F 17/30958 707/760 |
| 8,429,140 | B1* | 4/2013 | Lolayekar | G06F 17/30607 707/694 |
| 8,458,138 | B1* | 6/2013 | Sirianni | G06F 17/30221 707/679 |
| 8,473,503 | B2* | 6/2013 | Cheng | G06F 7/00 707/755 |
| 8,572,129 | B1* | 10/2013 | Lee | G06F 17/30861 707/798 |
| 8,601,025 | B1* | 12/2013 | Shajenko | G06F 17/30958 707/720 |
| 8,620,958 | B1* | 12/2013 | Adams | G06F 17/30 707/792 |
| 8,645,429 | B1* | 2/2014 | Bik | G06F 17/30958 707/797 |
| 8,732,208 | B2* | 5/2014 | Lee | G06F 17/3053 707/798 |
| 8,751,521 | B2* | 6/2014 | Lee | G06F 17/30958 705/319 |
| 8,782,080 | B2* | 7/2014 | Lee | G06F 17/30979 707/771 |
| 8,825,711 | B2* | 9/2014 | Chan | G06F 17/30958 707/798 |
| 8,843,526 | B2* | 9/2014 | Stoeck | G06F 17/30 707/798 |
| 8,868,603 | B2* | 10/2014 | Lee | G06F 17/30392 707/771 |
| 8,918,418 | B2* | 12/2014 | Lee | G06F 17/30392 705/319 |
| 9,015,212 | B2* | 4/2015 | David | G06F 17/30 707/692 |
| 9,218,438 | B2* | 12/2015 | Yu | G06F 17/30958 |
| 2006/0149776 | A1* | 7/2006 | Lin | G06F 17/30 |
| 2011/0004631 | A1* | 1/2011 | Inokuchi | G06F 17/30958 707/798 |
| 2011/0320394 | A1* | 12/2011 | McKeown | H04L 41/12 706/47 |
| 2012/0209886 | A1* | 8/2012 | Henderson | G06F 17/30557 707/798 |
| 2012/0233544 | A1* | 9/2012 | Roy | G06F 17/30 715/274 |
| 2012/0265788 | A1* | 10/2012 | Naeymi-Rad | G06F 19/322 707/798 |
| 2013/0080476 | A1* | 3/2013 | Tokai | G06F 17/30657 707/798 |
| 2013/0124573 | A1* | 5/2013 | Seth | G06F 9/4435 707/798 |
| 2013/0238667 | A1* | 9/2013 | Carvalho | G06F 17/30958 707/798 |
| 2013/0332490 | A1* | 12/2013 | Hu | G06N 5/02 707/798 |
| 2014/0046982 | A1* | 2/2014 | Chan | G06F 17/30958 707/798 |
| 2014/0108474 | A1* | 4/2014 | David | G06F 17/30 707/827 |
| 2014/0129594 | A1* | 5/2014 | Delling | G06F 17/30 707/797 |
| 2014/0137011 | A1 | 5/2014 | Matas | |
| 2014/0280533 | A1* | 9/2014 | Chedeau | H04L 67/306 709/204 |
| 2014/0324757 | A1* | 10/2014 | Tabrizi | G06F 17/30 706/50 |
| 2015/0032745 | A1* | 1/2015 | Chan | G06F 17/30958 707/736 |
| 2015/0058758 | A1* | 2/2015 | Tseng | H04L 51/32 715/758 |
| 2015/0066989 | A1 | 3/2015 | Yu | |
| 2015/0120736 | A1* | 4/2015 | Miyata | G06F 17/30964 707/738 |

OTHER PUBLICATIONS

Karp, Peter D., John D. Lowrance, Thomas M. Strat, and David E. Wilkins. "The Grasper-CL graph management system." LISP and Symbolic Computation 7, No. 4 (1994): 251-290.

Sakr, Sherif, and Ahmed Awad. "A framework for querying graph-based business process models." In Proceedings of the 19th international conference on World wide web, pp. 1297-1300. ACM, 2010.

Statement RE: Related Applications, dated Nov. 9, 2015.

Sep. 22, 2016 (US) Non-Final Office Action—U.S. Appl. No. 14/935,445.

May 22, 2015 (US) Non-Final Office Action—U.S. Appl. No. 14/011,986.

Jan. 13, 2016 (US) Notice of Allowance—U.S. Appl. No. 14/011,986.

\* cited by examiner

COMPUTING ARCHITECTURE FOR STORING A GRAPH DATABASE BASED ON TEMPORAL ASPECTS OF ITS EDGES

CROSS-REFERENCE TO RELATED APPLICATION

This application is a continuation of and claims priority to U.S. patent application Ser. No. 14/011,986, filed Aug. 28, 2013, and entitled "GRAPH DATABASE WITH ONE OR MORE INFRASTRUCTURE IMPARTED ASPECTS," the disclosure of which is incorporated by reference herein in its entirety and made part hereof.

BACKGROUND

Graph databases are used to represent and store data. Graph databases typically employ nodes, edges, and properties to represent information. Nodes often represent entities, while edges are often utilized to connect one or more nodes with each other and/or one or more properties Graph databases are generally preferred for representing associative data sets, and are considered well-suited for ad hoc and/or evolving data sets. One limitation of graph databases, however, is their limited ability to represent information beyond the association of nodes with one another and/or with one or more properties. Accordingly, a need exists for graph databases with one or more infrastructure imparted aspects.

SUMMARY

The following presents a simplified summary in order to provide a basic understanding of some aspects of the disclosure. This summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In accordance with one or more embodiments, data specifying a new edge of a graph database may be received. The data specifying the new edge of the graph database may include information identifying a first node of the graph database and a second node of the graph database. The new edge may associate the first node of the graph database with the second node of the graph database. A data store for storing the new edge may be identified from amongst a plurality of data stores utilized to store one or more portions of the graph database. Each of the plurality of data stores may be associated with a set of values corresponding to an aspect of edges of the graph database. The data store for storing the new edge may be identified based on the new edge being associated with a value corresponding to the aspect of edges of the graph database that is within a set of values corresponding to the aspect of edges of the graph database associated with the data store for storing the new edge.

In some embodiments, the aspect of the edges of the graph database may be a time when nodes of the graph database were associated with one another. In such embodiments, the value corresponding to the aspect of edges of the graph database may be a time when the first node of the graph database and the second node of the graph database were associated with one another, the set of values corresponding to the aspect of edges of the graph database associated with the data store for storing the new edge may be a time range, and identifying the data store for storing the new edge may include determining that the time when the first node of the graph database and the second node of the graph database were associated with each other is within the time range.

In some embodiments, the aspect of the edges of the graph database may be a geographic location where nodes of the graph database were associated with one another. In such embodiments, the value corresponding to the aspect of edges of the graph database may be a geographic location where the first node of the graph database and the second node of the graph database were associated with one another, the set of values corresponding to the aspect of edges of the graph database associated with the data store for storing the new edge may include one or more geographic locations, and identifying the data store for storing the new edge may include determining that the geographic location where the first node of the graph database and the second node of the graph database were associated with each other is one of the one or more geographic locations.

In some embodiments, the plurality of data stores utilized to store one or more portions of the graph database may include a plurality of distinct computing platforms. Each of the plurality of distinct computing platforms may be associated with a set of values corresponding to the aspect of edges of the graph database. In some embodiments, the plurality of distinct computing platforms may include at least two distinct physical computing platforms. Each of the two distinct physical computing platforms may be associated with a different set of values corresponding to the aspect of the edges of the graph database. Additionally or alternatively, the plurality of distinct computing platforms may include at least two distinct virtual computing platforms. Each of the two distinct virtual computing platforms may be associated with a different set of values corresponding to the aspect of the edges of the graph database.

In some embodiments, each of the plurality of data stores may be associated with an additional set of values corresponding to an additional aspect of edges of the graph database. In such embodiments, the data store for storing the new edge may be identified based on the new edge being associated with a value corresponding to the additional aspect of edges of the graph database that is within an additional set of values corresponding to the additional aspect of edges of the graph database associated with the data store for storing the new edge. In some embodiments, the aspect of edges of the graph database and the additional aspect of edges of the graph database may specify a common aspect of edges of the graph database. In such embodiments, the additional aspect of edges of the graph database may specify the common aspect of edges of the graph database at a greater level of specificity than the aspect of edges of the graph database. In other embodiments, the aspect of edges of the graph database and the additional aspect of edges of the graph database may specify a different aspect of edges of the graph database. In such embodiments, the aspect of the edges of the graph database may be a time when nodes of the graph database were associated with one another, and the additional aspect of the edges of the graph database may be a geographic location where nodes of the graph database were associated with one another.

In some embodiments, the aspect of the edges of the graph database may be a time when nodes of the graph database were associated with one another. A set of values corresponding to the aspect of edges of the graph database that is associated with at least one data store of the plurality of data stores may be a time range that includes one or more past times. One or more edges of the graph database stored by the at least one data store may be deleted, and the set of values may be altered to include one or more future times. Additionally or alternatively, the at least one data store may be disassociated from the graph database, and a new data store may be associated with the graph database. The new data store may be associated with a set of values corresponding to the aspect of edges of the graph database, and the set of values may be a new time range that includes one or more future times.

In some embodiments, the graph database may be queried based on the aspect of edges of the graph database. The graph database may be queried for a set of edges of the graph database that are associated with one or more values within a specified set of values corresponding to the aspect of edges of the graph database. In some embodiments, a portion of the plurality of data stores may be identified. Each data store of the portion of the plurality of data stores may be associated with a set of values corresponding to the aspect of edges of the graph database that includes at least one of the one or more values within the specified set of values, and querying of the graph database may be constrained to the portion of the plurality of data stores. Additionally or alternatively, each data store of the portion of the plurality data stores may be associated with a set of values corresponding to the aspect of edges of the graph database that fails to include a value within the specified set of values, and the portion of the plurality of data stores may be excluded from the query of the graph database.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
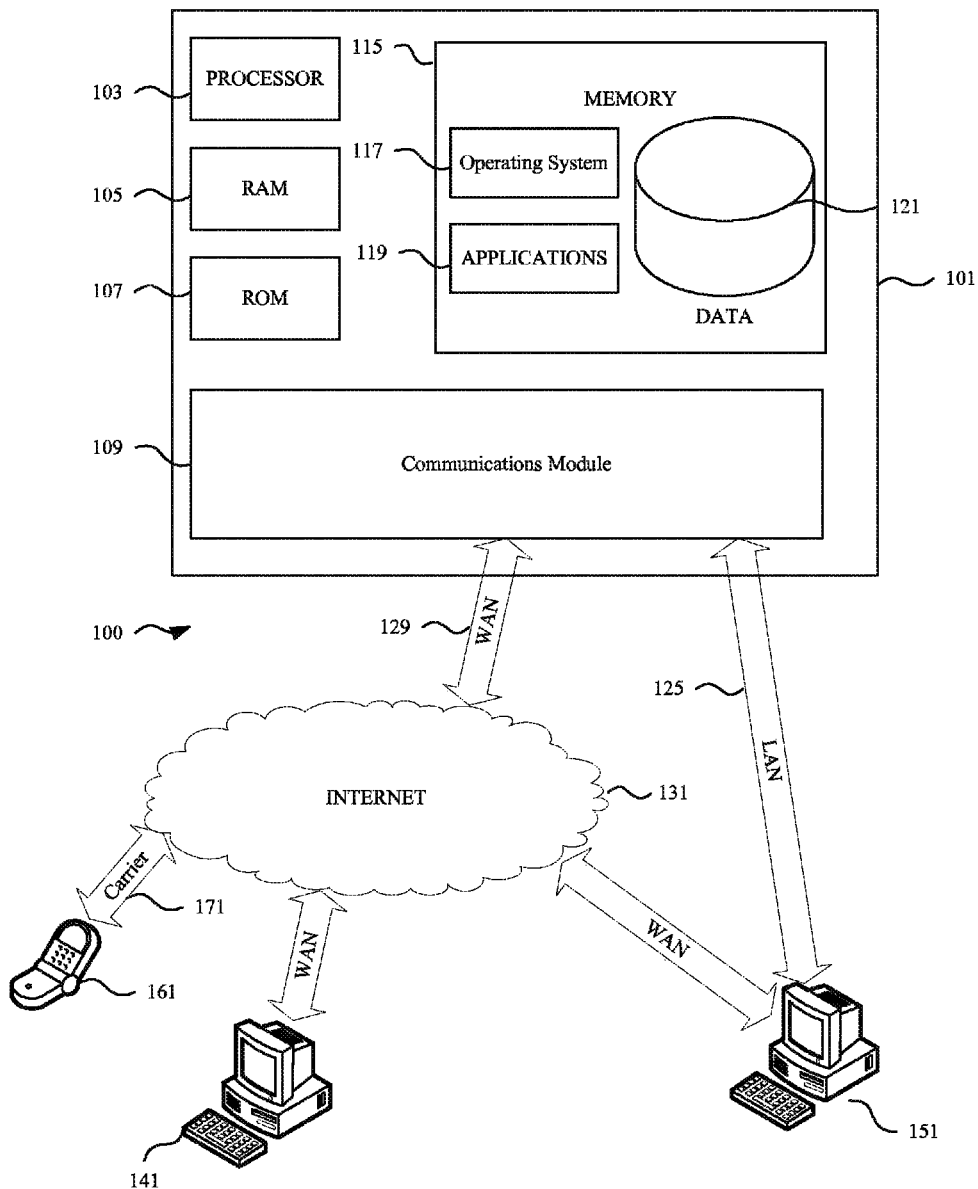
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
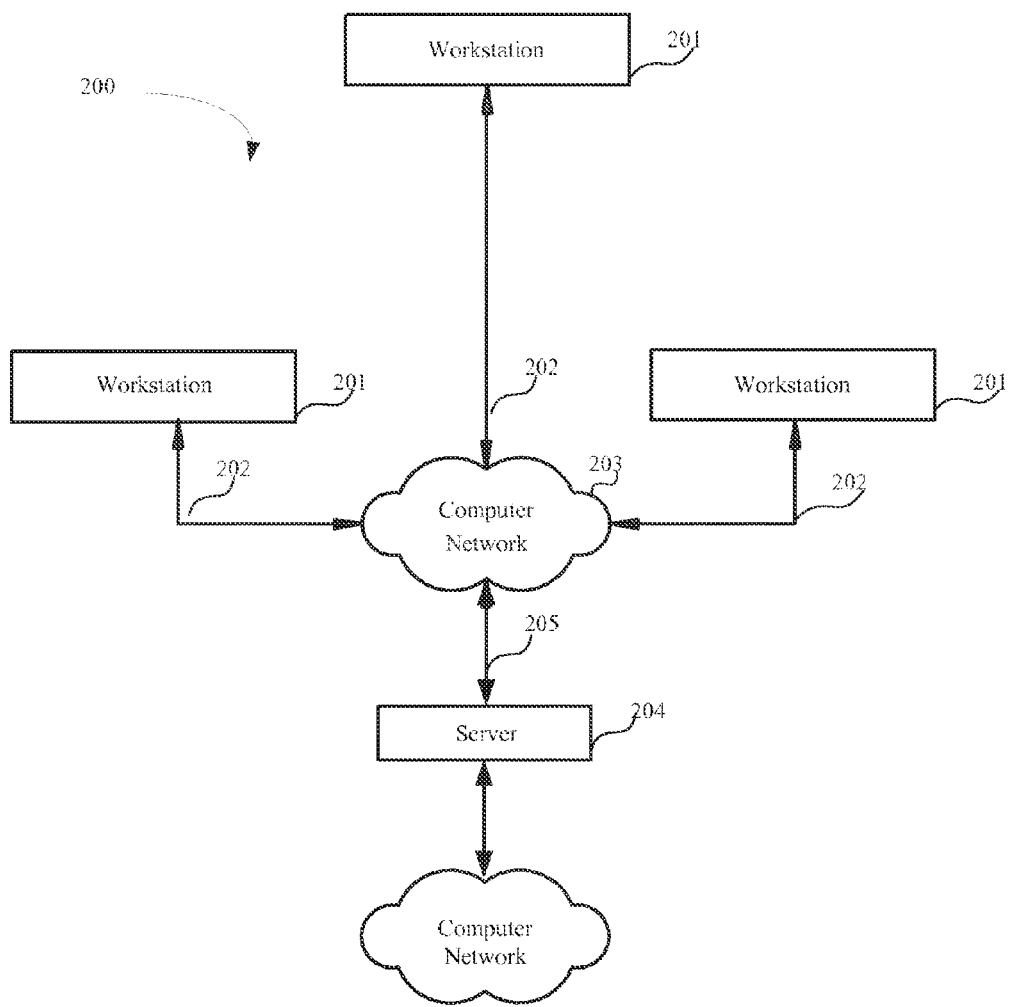
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
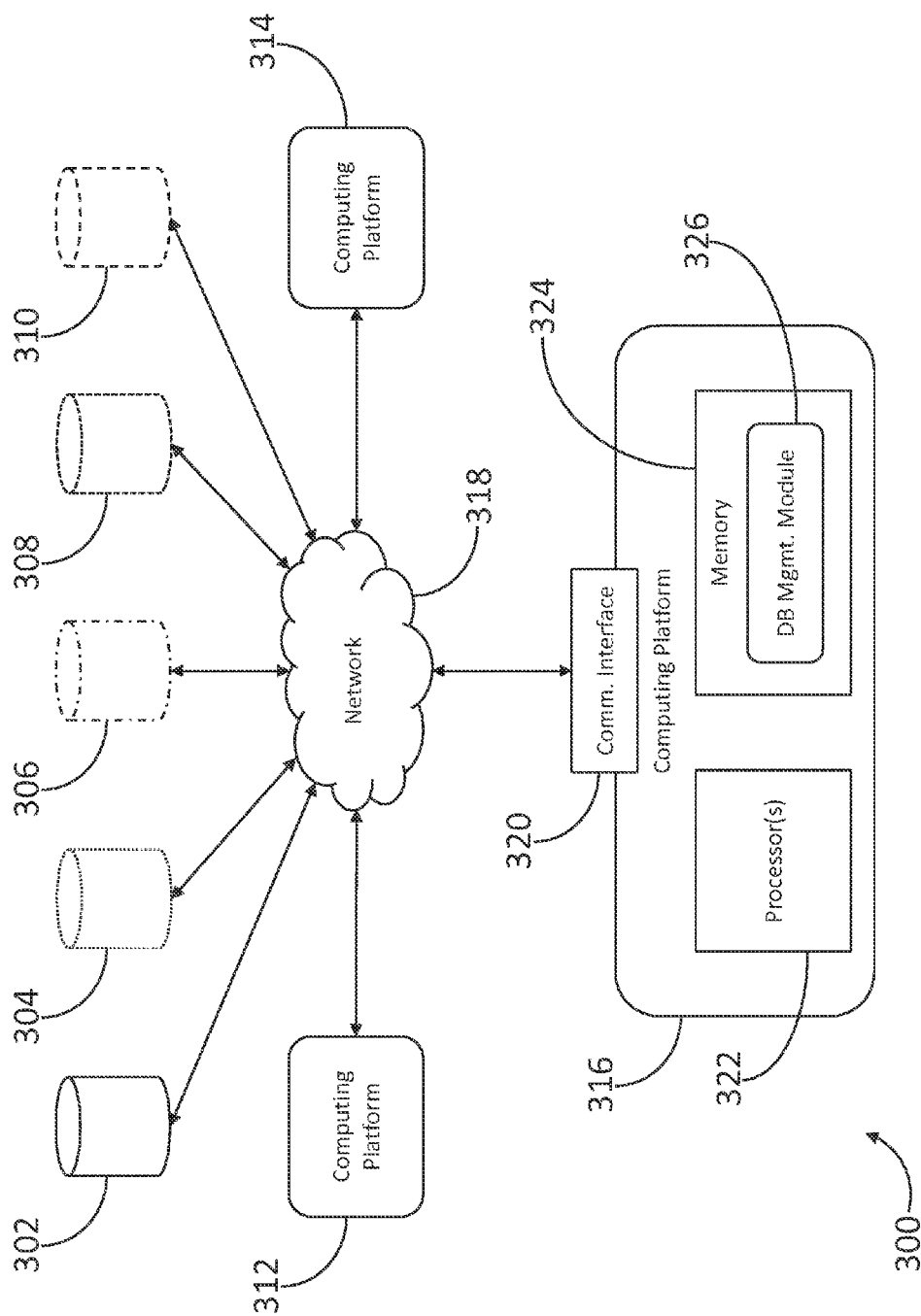
FIG. 3 depicts an illustrative computing environment for building, maintaining, and querying a graph database with one or more infrastructure imparted aspects in accordance with one or more example embodiments.

FIG. 3 depicts an illustrative computing environment for building, maintaining, and querying a graph database with one or more infrastructure imparted aspects in accordance with one or more example embodiments. Referring to FIG. 3, computing environment 300 may include one or more computing platforms. For example, computing environment 300 may include data stores 302, 304, 306, 308, and 310, and computing platforms 312, 314, and 316. Data stores 302, 304, 306, 308, and 310 may include any type of computer accessible medium for storing one or more records (e.g., edges) of a graph database. For example, one or more of data stores 302, 304, 306, 308, and 310 may be a memory, disk drive, network appliance, physical computing platform, virtual computing platform, or any other type of computer accessible/readable medium for storing one or more records of a graph database. Computing platforms 312, 314, and 316 may include one or more computing devices, which may include one or more processors, memories, and/or communication interfaces, and may, as described in greater detail below, perform one or more functions described herein. Computing environment 300 may also include network 318, which may interconnect one or more of data stores 302, 304, 306, 308, and 310, and/or computing platforms 312, 314, and 316. Network 318 may include one or more sub-networks (not illustrated), for example, LANs and/or WANs.

Computing platform 316 may include communication interface 320, processor(s) 322, and memory 324. Communication interface 320 may be a network interface that interfaces computing platform 316 with network 318, and may support intercommunication between computing platform 316 and one or more of data stores 302, 304, 306, 308, and 310, and/or computing platforms 312 and 314. Memory 324 may include one or more program modules that comprise instructions that, when executed by processor(s) 322, cause computing platform 316 to perform one or more functions. For example, memory 324 may include database management module 326. As will be described in greater detail below, database management module 326 may comprise instructions that, when executed by processor(s) 322, cause computing platform 316 to receive data specifying a new edge of a graph database. The data specifying the new edge of the graph database may include information identifying a first node of the graph database and a second node of the graph database. The new edge may associate the first node of the graph database with the second node of the graph database. Computing platform 316 may identify a data store for storing the new edge from amongst a plurality of data stores utilized to store one or more portions of the graph database. Each of the plurality of data stores may be associated with a set of values corresponding to an aspect of edges of the graph database. Computing platform 316 may identify the data store for storing the new edge based on the new edge being associated with a value corresponding to the aspect of edges of the graph database that is within a set of values corresponding to the aspect of edges of the graph database associated with the data store for storing the new edge.

Figure 4:
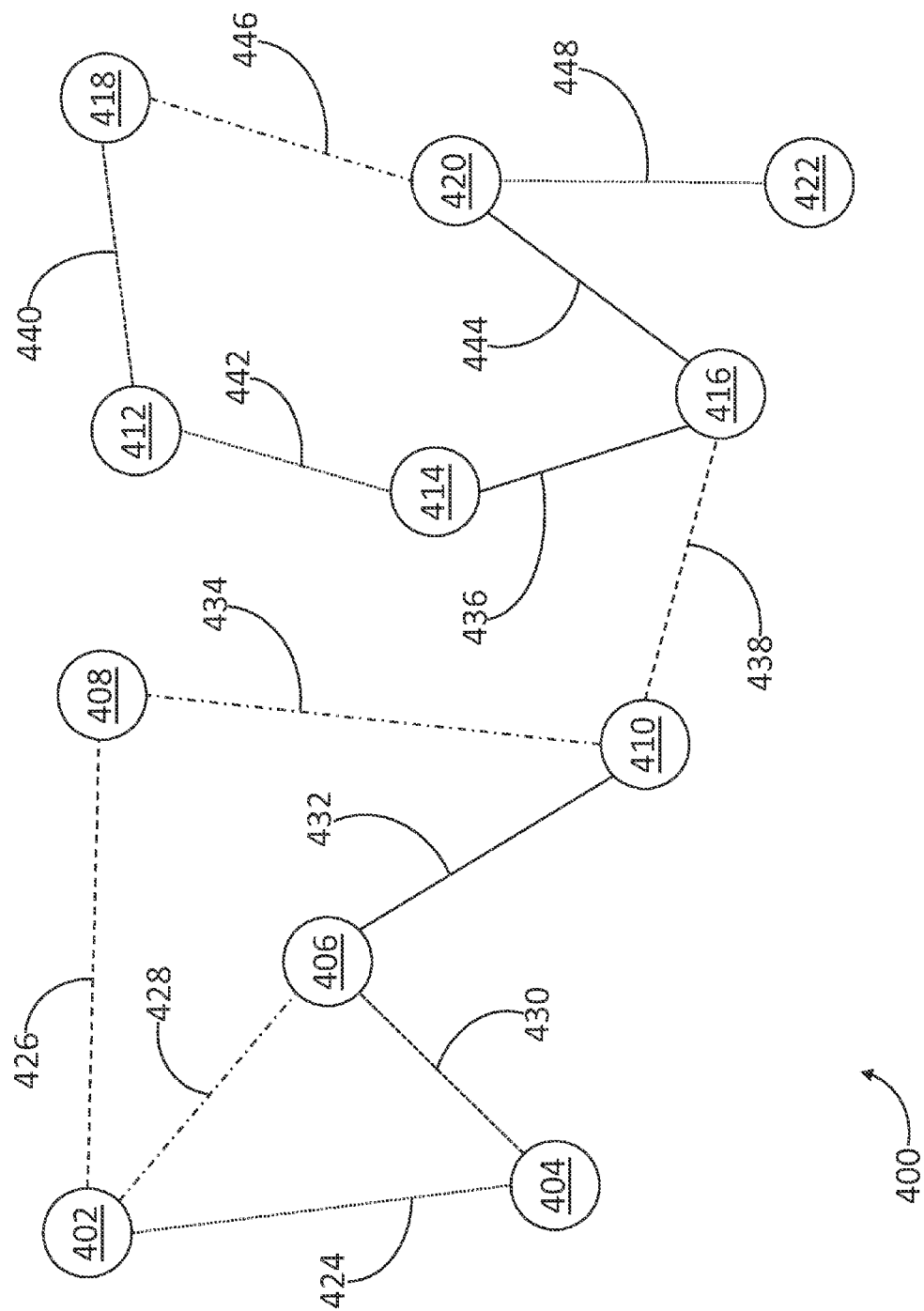
FIG. 4 depicts an illustrative graph database with one or more infrastructure imparted aspects in accordance with one or more example embodiments.

FIG. 4 depicts an illustrative graph database with one or more infrastructure imparted aspects in accordance with one or more example embodiments. Referring to FIG. 4, graph database 400 may include one or more nodes. For example, graph database 400 may include nodes 402, 404, 406, 408, 410, 412, 414, 416, 418, 420, and 422. Graph database 400 may also include one or more edges, which may connect (or associate) one or more nodes with one another. For example, graph database 400 may include edges 424, 426, 428, 430, 432, 434, 436, 438, 440, 442, 444, 446, and 448. As illustrated, edge 424 may connect (or associate) nodes 402 and 404. Similarly, edge 426 may connect nodes 402 and 408, edge 428 may connect nodes 402 and 406, edge 430 may connect nodes 404 and 406, edge 432 may connect nodes 406 and 410, edge 434 may connect nodes 408 and 410, edge 436 may connect nodes 414 and 416, edge 438 may connect nodes 410 and 416, edge 440 may connect nodes 412 and 418, edge 442 may connect nodes 412 and 414, edge 444 may connect nodes 416 and 420, edge 444 may connect nodes 416 and 420, edge 446 may connect nodes 418 and 420, and edge 448 may connect nodes 420 and 422.

In accordance with aspects of the disclosure, the infrastructure utilized to store one or more of the edges of graph database 400 may impart one or more aspects of the edges of graph database 400 on the edges of graph database 400. The edges of graph database 400 may be stored in one of a plurality of distinct data stores. For example, each edge of graph database 400 may be stored in one of data stores 302, 304, 306, 308, or 310. For purposes of illustration, the various line styles of edges 424, 426, 428, 430, 432, 434, 436, 438, 440, 442, 444, 446, and 448 illustrate the respective data store, of data stores 302, 304, 306, 308, and 310, in which the edge is stored, the data store in which an edge is stored having a line style corresponding the edge. For example, edges 432, 436, and 444 may be stored in data store 302. Similarly, edges 424, 442, and 448 may be stored in data store 304; edges 428, 434, and 446 may be stored in data store 306; edges 430 and 440 may be stored in data store 308; and edges 426 and 438 may be stored in data store 310.

Each of data stores 302, 304, 306, 308, and 310 may be associated with a set of values corresponding to an aspect of edges of the graph database. In some embodiments, the aspect of the edges of the graph database may be a time when nodes of the graph database were associated with one another. For example, each of data stores 302, 304, 306, 308, and 310 may be associated with a time rage. Each edge stored within data stores 302, 304, 306, 308, and 310 may be associated with a time at which nodes connected by the edge were associated with one another, and each edge may be stored in a data store associated with a time range that includes the time when the nodes connected by the edge were associated with one another. For example, data store 302 may be associated with a time range corresponding to Monday. Similarly, data store 304 may be associated with a time range corresponding to Tuesday, data store 306 may be associated with a time range corresponding to Wednesday, data store 308 may be associated with a time range corresponding to Thursday, and data store 310 may be associated with a time range corresponding to Friday. It will be appreciated that any time range may be utilized (e.g., a time range spanning minutes, hours, days, weeks, months, or years).

On Monday, computing platform 316 may receive data specifying edge 432. For example, computing platform 312 may include one or more servers that process information associated with entities represented by one or more of nodes 402, 404, 406, 408, 410, 412, 414, 416, 418, 420, and 422. Computing platform 312 may make a determination that one or more entities represented by nodes 406 and 410 have become associated with one another, and may communicate data identifying nodes 406 and 410 to computing platform 316. Computing platform 316 may identify data store 302 as being associated with a time range corresponding to Monday, and may store edge 432 connecting nodes 406 and 410 in data store 302. Similarly, on Monday, computing platform 316 may receive data specifying edges 436 and 444, respectively connecting nodes 414 and 416, and nodes 416 and 420. Computing platform 316 may identify data store 302 as being associated with a time range corresponding to Monday, and may store edges 436 and 444 in data store 302.

On Tuesday, computing platform 316 may receive data specifying edge 424. For example, computing platform 314 may include one or more servers that process information associated with entities represented by one or more of nodes 402, 404, 406, 408, 410, 412, 414, 416, 418, 420, and 422. Computing platform 314 may make a determination that one or more entities represented by nodes 402 and 404 have become associated with one another, and may communicate data identifying nodes 402 and 404 to computing platform 316. Computing platform 316 may identify data store 304 as being associated with a time range corresponding to Tuesday, and may store edge 424 connecting nodes 402 and 404 in data store 304. Similarly, on Tuesday, computing platform 316 may receive data specifying edges 442 and 448, respectively connecting nodes 412 and 414, and nodes 420 and 422. Computing platform 316 may identify data store 304 as being associated with a time range corresponding to Tuesday, and may store edges 442 and 448 in data store 304.

On Wednesday, computing platform 316 may receive data specifying edge 428 (e.g., from computing platform 312 or 314). Computing platform 316 may identify data store 306 as being associated with a time range corresponding to Wednesday, and may store edge 428 connecting nodes 402 and 406 in data store 306. Similarly, on Wednesday, computing platform 316 may receive data specifying edges 434 and 446, respectively connecting nodes 408 and 410, and nodes 418 and 420. Computing platform 316 may identify data store 306 as being associated with a time range corresponding to Wednesday, and may store edges 434 and 446 in data store 306.

Similarly, on Thursday, computing platform 316 may receive data specifying edges 430 and 440 (e.g., from computing platforms 312 and/or 314), respectively connecting nodes 404 and 406, and nodes 412 and 418. Computing platform 316 may identify data store 308 as being associated with a time range corresponding to Thursday, and may store edges 430 and 440 in data store 308. And, on Friday, computing platform 316 may receive data specifying edges 426 and 438 (e.g., from computing platforms 312 and/or 314), respectively connecting nodes 402 and 408, and nodes 410 and 416. Computing platform 316 may identify data store 310 as being associated with a time range corresponding to Friday, and may store edges 426 and 438 in data store 310.

In other embodiments, the aspect of the edges of the graph database may be a geographic location where nodes of the graph database were associated with one another. For example, each of data stores 302, 304, 306, 308, and 310 may be associated with one or more geographic locations. Each edge stored within data stores 302, 304, 306, 308, and 310 may be associated with a geographic location where nodes connected by the edge were associated with one another, and each edge may be stored in a data store associated with one or more geographic locations that includes the geographic location where the nodes connected by the edge were associated with one another. For example, data store 302 may be associated with North America. Similarly, data store 304 may be associated with South America, data store 306 may be associated with Europe, data store 308 may be associated with Asia, and data store 310 may be associated with Africa. It will be appreciated that any type of geographic location may be utilized (e.g., ranges of latitude and/or longitude, countries, cities, states, ports, and the like).

Computing platform 316 may receive data specifying edge 432. For example, computing platform 312 may include one or more servers that process information associated with entities represented by one or more of nodes 402, 404, 406, 408, 410, 412, 414, 416, 418, 420, and 422 for North America. Computing platform 312 may make a determination that one or more entities represented by nodes 406 and 410 have become associated with one another, and may communicate data identifying nodes 406 and 410 to computing platform 316. Computing platform 316 may identify data store 302 as being associated with North America, and may store edge 432 connecting nodes 406 and 410 in data store 302. Similarly, computing platform 316 may receive data specifying edges 436 and 444, respectively connecting nodes 414 and 416, and nodes 416 and 420, from the one or more servers that process information associated with entities represented by one or more of nodes 402, 404, 406, 408, 410, 412, 414, 416, 418, 420, and 422 for North America. Computing platform 316 may identify data store 302 as being associated with North America, and may store edges 436 and 444 in data store 302.

Similarly, computing platform 316 may receive data specifying edge 424. For example, computing platform 314 may include one or more servers that process information associated with entities represented by one or more of nodes 402, 404, 406, 408, 410, 412, 414, 416, 418, 420, and 422 for South America. Computing platform 314 may make a determination that one or more entities represented by nodes 402 and 404 have become associated with one another, and may communicate data identifying nodes 402 and 404 to computing platform 316. Computing platform 316 may identify data store 304 as being associated with South America, and may store edge 424 connecting nodes 402 and 404 in data store 304. Similarly, computing platform 316 may receive data specifying edges 442 and 448, respectively connecting nodes 412 and 414, and nodes 420 and 422 from the one or more servers that process information associated with entities represented by one or more of nodes 402, 404, 406, 408, 410, 412, 414, 416, 418, 420, and 422 for South America. Computing platform 316 may identify data store 304 as being associated with South America, and may store edges 442 and 448 in data store 304.

In similar fashion, computing platform 316 may receive data specifying edges 428, 434, and 446 (e.g., from one or more servers that process information associated with entities represented by one or more of nodes 402, 404, 406, 408, 410, 412, 414, 416, 418, 420, and 422 for Europe), and computing platform 316 may identify data store 306 as being associated with Europe, and may store edges 428, 434, and 446, respectively connecting nodes 402 and 406, nodes 408 and 410, and nodes 418 and 420 in data store 306; computing platform 316 may receive data specifying edges 430 and 440 (e.g., from one or more servers that process information associated with entities represented by one or more of nodes 402, 404, 406, 408, 410, 412, 414, 416, 418, 420, and 422 for Asia), and computing platform 316 may identify data store 308 as being associated with Asia, and may store edges 430 and 440, respectively connecting nodes 404 and 406, and nodes 412 and 418 in data store 308; and computing platform 316 may receive data specifying edges 426 and 438 (e.g., from one or more servers that process information associated with entities represented by one or more of nodes 402, 404, 406, 408, 410, 412, 414, 416, 418, 420, and 422 for Africa), and computing platform 316 may identify data store 310 as being associated with Africa, and may store edges 426 and 438, respectively connecting nodes 402 and 408, and nodes 410 and 416 in data store 310.

In querying graph database 400, the aspect of the edges of the graph database imparted by the infrastructure may be utilized. For example, graph database 400 may be queried for a set of edges that are associated with one or more values within a specified set of values corresponding to the aspect of edges of the graph database. Returning to the time example described above, for example, graph database 400 may be queried for edges associated with Wednesday, Thursday, or Friday. A portion of data stores 302, 304, 306, 308, and 310 associated with Wednesday, Thursday, and Friday may be identified (e.g., data stores 306, 308, and 310), and querying of graph database 400 may be constrained to the portion of data stores 302, 304, 306, 308, and 310 associated with Wednesday, Thursday, and Friday (e.g., data stores 306, 308, and 310). Additionally or alternatively, a portion of data stores 302, 304, 306, 308, and 310 not associated with Wednesday, Thursday, or Friday may be identified (e.g., data stores 302 and 304), and may be excluded from the query of the graph database. It will be appreciated that by constraining querying of graph database 400 to one or more data sources that impart the specified values corresponding to the aspect of the edges of the graph database and/or excluding one or more data sources that fail to impart the specified values corresponding to the aspect of the edges of the graph database, an individual examination of one or more attributes of edges 424, 426, 428, 430, 432, 434, 436, 438, 440, 442, 444, 446, and 448 may be avoided, thereby increasing efficiency of the query.

As indicated above, in some embodiments, the aspect of the edges of the graph database may be a time when nodes of the graph database were associated with one another (e.g., Monday, Tuesday, Wednesday, Thursday, Friday, or the like). A set of values corresponding to the aspect of edges of the graph database that is associated with at least one data store of the plurality of data stores may be a time range that includes one or more past times. For example, it may currently be Wednesday, and data stores 302 and 304 may be respectively associated with the preceding Monday and Tuesday. One or more edges of the graph database stored by the at least one data store may be deleted, and the set of values may be altered to include one or more future times. For example, edges 432, 436, and 444 may be deleted from data store 302, edges 424, 442, and 448 may be deleted from data store 304, and the time ranges associated with data stores 302 and 304 may be respectively altered to correspond to the following Monday and Tuesday. Additionally or alternatively, the at least one data store may be disassociated from the graph database, and a new data store may be associated with the graph database. The new data store may be associated with a set of values corresponding to the aspect of edges of the graph database, and the set of values may be a new time range that includes one or more future times. For example, data stores 302 and 304 may be disassociated from graph database 400, and one or more new data stores (not illustrated) may be associated with graph database 400. The new data stores may be associated with time ranges corresponding to the following Monday and Tuesday. It will be appreciated, that in embodiments where the aspect of the edges of the graph database is a time when nodes of the graph database were associated with one another, such a methodology may be utilized to limit graph database 400 to contemporaneous data.

In some embodiments, each of data stores 302, 304, 306, 308, and 310 may be associated with an additional set of values corresponding to an additional aspect of edges of graph database 400. In some embodiments, the aspect of edges of the graph database and the additional aspect of edges of the graph database may specify a common aspect of edges of the graph database, and the additional aspect may specify the common aspect of the edges at a greater level of specificity than the aspect of the edges. For example, each of data stores 302, 304, 306, 308, and 310 may include component data stores associated with AM and PM times. Computing platform 316 may identify a data store for storing a new edge based on the new edge being associated with a value corresponding to the additional aspect of edges of the graph database that is within an additional set of values corresponding to the additional aspect of edges of the graph database associated with the data store for storing the new edge. For example, computing platform 316 may identify a component data store of data store 302 associated with AM times and may store edge 432 in the component data store of data store 302 associated with AM times based on nodes 406 and 410 being associated during an AM time on Monday. Similarly, computing platform 316 may identify a component data store of data store 302 associated with PM times and may store edges 436 and 444 in the component data store of data store 302 associated with PM times based on nodes 414 and 416, and nodes 416 and 420 being associated during PM times on Monday.

In other embodiments, the aspect of edges of graph database 400 and the additional aspect of edges of graph database 400 may specify a different aspect of the edges. For example, the aspect of the edges may be a time when nodes of the graph database were associated with one another, and the additional aspect of the edges may be a geographic location where nodes of the graph database were associated with one another. In such an example, each of data stores 302, 304, 306, 308, and 310 may include component data stores associated with various geographic locations (e.g., North America, South America, Europe, Asia, Africa, or the like). Computing platform 316 may identify a data store for storing a new edge based on the new edge being associated with a value corresponding to the additional aspect of edges of the graph database that is within an additional set of values corresponding to the additional aspect of edges of the graph database associated with the data store for storing the new edge. For example, computing platform 316 may identify a component data store of data store 302 associated with North America and may store edge 432 in the component data store of data store 302 associated with North America based on nodes 406 and 410 being associated on Monday in North America. Similarly, computing platform 316 may identify a component data store of data store 302 associated with South America and may store edges 436 and 444 in the component data store of data store 302 associated with South America based on nodes 414 and 416, and nodes 416 and 420 being associated on Monday in South America. It will be appreciated, that this methodology may be extended to n levels of depth to impart n aspects of the edges via one or more data stores (or components thereof).

Figure 5:
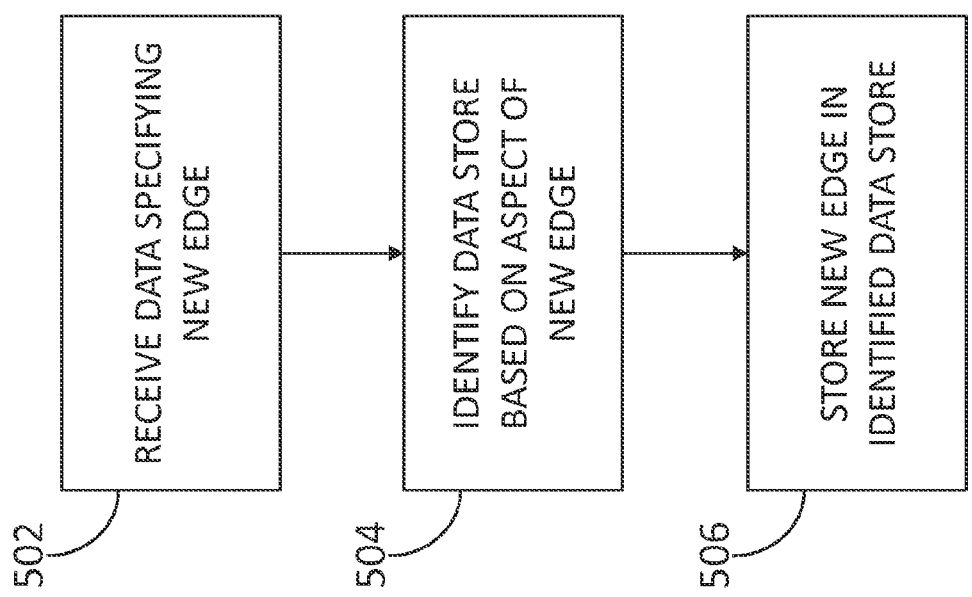
FIG. 5 depicts an illustrative method for building a graph database with one or more infrastructure imparted aspects in accordance with one or more example embodiments.

FIG. 5 depicts an illustrative method for building a graph database with one or more infrastructure imparted aspects in accordance with one or more example embodiments. Referring to FIG. 5, at step 502, data specifying a new edge of a graph database may be received. For example, computing platform 316 may receive data specifying edge 432 from computing platform 312. The data specifying the new edge of the graph database may include information identifying a first node of the graph database and a second node of the graph database. For example, the data specifying edge 432 may include information identifying nodes 406 and 410. The new edge may associate the first node of the graph database with the second node of the graph database. For example, edge 432 may associate nodes 406 and 410. At step 504, a data store for storing the new edge may be identified from amongst a plurality of data stores utilized to store one or more portions of the graph database. For example, data store 302 may be identified, from amongst data stores 302, 304, 306, 308, and 310, for storing edge 432. Each of the plurality of data stores may be associated with a set of values corresponding to an aspect of edges of the graph database. For example, data store 302 may be associated with a time range corresponding to Monday, data store 304 may be associated with a time range corresponding to Tuesday, data store 306 may be associated with a time range corresponding to Wednesday, data store 308 may be associated with a time range corresponding to Thursday, and data store 310 may be associated with a time range corresponding to Friday. The data store for storing the new edge may be identified based on the new edge being associated with a value corresponding to the aspect of edges of the graph database that is within a set of values corresponding to the aspect of edges of the graph database associated with the data store for storing the new edge. For example, data store 302 may be identified based on the data specifying edge 432 being received from computing platform 312 on Monday, and data store 302 being associated with a time range corresponding to Monday. At step 506, data specifying the new edge of the graph database may be stored in the identified data store. For example, data specifying edge 432 may be stored in data store 302. In some embodiments, storing the data specifying the new edge may include creating one or more data entries in the data store, the one or more data entries specifying the new edge of the graph database.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, a memory, and a communication interface:
   receiving, via the communication interface, data specifying a new edge of a graph database, wherein the data specifying the new edge of the graph database comprises information identifying a first node of the graph database and a second node of the graph database, the new edge associating the first node of the graph database with the second node of the graph database; and
   identifying, by the at least one processor and from amongst a plurality of data stores utilized to store one or more portions of the graph database, a data store for storing the new edge, wherein each of the plurality of data stores is associated with a set of values corresponding to an aspect of edges of the graph database, and wherein the data store for storing the new edge is identified based on the new edge being associated with a value corresponding to the aspect of edges of the graph database that is within a set of values corresponding to the aspect of edges of the graph database associated with the data store for storing the new edge,
   wherein the aspect of the edges of the graph database is a time when nodes of the graph database were associated with one another, wherein a set of values corresponding to the aspect of edges of the graph database that is associated with at least one data store of the plurality of data stores comprises a time range, the time range comprising one or more past times, and wherein the plurality of data stores utilized to store one or more portions of the graph database are associated with the graph database, and
   wherein the method further comprises:
   disassociating the at least one data store from the graph database; and
   associating a new data store with the graph database, the new data store being associated with a set of values corresponding to the aspect of edges of the graph database, the set of values comprising a new time range, the new time range comprising one or more future times.

2. The method of claim 1, comprising querying the graph database based on the aspect of edges of the graph database.

3. The method of claim 2, comprising querying the graph database for a set of edges of the graph database that are associated with one or more values within a specified set of values corresponding to the aspect of edges of the graph database.

4. The method of claim 2, comprising:
   identifying a portion of the plurality of data stores, each data store of the portion of the plurality of data stores being associated with a set of values corresponding to the aspect of edges of the graph database that includes at least one of the one or more values within the specified set of values; and
   constraining querying of the graph database to the portion of the plurality of data stores.

5. The method of claim 2, comprising:
   identifying a portion of the plurality of data stores, each data store of the portion of the plurality data stores being associated with a set of values corresponding to the aspect of edges of the graph database that fails to include a value within the specified set of values; and
   excluding the portion of the plurality of data stores from querying of the graph database.

6. A computing platform, comprising:
   at least one processor;
   a communication interface; and
   a memory storing instructions that, when executed by the at least one processor, cause the computing platform to:
   receive, via the communication interface, data specifying a new edge of a graph database, wherein the data specifying the new edge of the graph database comprises information identifying a first node of the graph database and a second node of the graph database, the new edge associating the first node of the graph database with the second node of the graph database; and
   identify, by the at least one processor and from amongst a plurality of data stores utilized to store one or more portions of the graph database, a data store for storing the new edge, wherein each of the plurality of data stores is associated with a set of values corresponding to an aspect of edges of the graph database, and wherein the data store for storing the new edge is identified based on the new edge being associated with a value corresponding to the aspect of edges of the graph database that is within a set of values corresponding to the aspect of edges of the graph database associated with the data store for storing the new edge,
   wherein the aspect of the edges of the graph database is a time when nodes of the graph database were associated with one another, wherein a set of values corresponding to the aspect of edges of the graph database that is associated with at least one data store of the plurality of data stores comprises a time range, the time range comprising one or more past times, and wherein the plurality of data stores utilized to store one or more portions of the graph database are associated with the graph database, and wherein the memory stores additional instructions that, when executed by the at least one processor, cause the computing platform to:

disassociate the at least one data store from the graph database; and associate a new data store with the graph database, the new data store being associated with a set of values corresponding to the aspect of edges of the graph database, the set of values comprising a new time range, the new time range comprising one or more future times.

7. The computing platform of claim 6, wherein the memory stores additional instructions that, when executed by the at least one processor, cause the computing platform to query the graph database based on the aspect of edges of the graph database.

8. The computing platform of claim 7, wherein the memory stores additional instructions that, when executed by the at least one processor, cause the computing platform to query the graph database for a set of edges of the graph database that are associated with one or more values within a specified set of values corresponding to the aspect of edges of the graph database.

9. The computing platform of claim 7, wherein the memory stores additional instructions that, when executed by the at least one processor, cause the computing platform to:

identify a portion of the plurality of data stores, each data store of the portion of the plurality of data stores being associated with a set of values corresponding to the aspect of edges of the graph database that includes at least one of the one or more values within the specified set of values; and constrain querying of the graph database to the portion of the plurality of data stores.

10. The computing platform of claim 7, wherein the memory stores additional instructions that, when executed by the at least one processor, cause the computing platform to:

identify a portion of the plurality of data stores, each data store of the portion of the plurality data stores being associated with a set of values corresponding to the aspect of edges of the graph database that fails to include a value within the specified set of values; and exclude the portion of the plurality of data stores from querying of the graph database.

11. One or more non-transitory computer-readable media having instructions stored thereon that, when executed by a computing platform comprising at least one processor and a communication interface, cause the computing platform to:

receive, via the communication interface, data specifying a new edge of a graph database, wherein the data specifying the new edge of the graph database comprises information identifying a first node of the graph database and a second node of the graph database, the new edge associating the first node of the graph database with the second node of the graph database; and identify, by the at least one processor and from amongst a plurality of data stores utilized to store one or more portions of the graph database, a data store for storing the new edge, wherein each of the plurality of data stores is associated with a set of values corresponding to an aspect of edges of the graph database, and wherein the data store for storing the new edge is identified based on the new edge being associated with a value corresponding to the aspect of edges of the graph database that is within a set of values corresponding to the aspect of edges of the graph database associated with the data store for storing the new edge, wherein the aspect of the edges of the graph database is a time when nodes of the graph database were associated with one another, wherein a set of values corresponding to the aspect of edges of the graph database that is associated with at least one data store of the plurality of data stores comprises a time range, the time range comprising one or more past times, and wherein the plurality of data stores utilized to store one or more portions of the graph database are associated with the graph database, and wherein the one or more non-transitory computer-readable media have additional instructions stored thereon that, when executed by the computing platform, cause the computing platform to:

disassociate the at least one data store from the graph database; and associate a new data store with the graph database, the new data store being associated with a set of values corresponding to the aspect of edges of the graph database, the set of values comprising a new time range, the new time range comprising one or more future times.

12. The one or more non-transitory computer-readable media of claim 11, having additional instructions stored thereon that, when executed by the computing platform, cause the computing platform to query the graph database based on the aspect of edges of the graph database.

13. The one or more non-transitory computer-readable media of claim 12, having additional instructions stored thereon that, when executed by the computing platform, cause the computing platform to query the graph database for a set of edges of the graph database that are associated with one or more values within a specified set of values corresponding to the aspect of edges of the graph database.

14. The one or more non-transitory computer-readable media of claim 12, having additional instructions stored thereon that, when executed by the computing platform, cause the computing platform to:

identify a portion of the plurality of data stores, each data store of the portion of the plurality of data stores being associated with a set of values corresponding to the aspect of edges of the graph database that includes at least one of the one or more values within the specified set of values; and constrain querying of the graph database to the portion of the plurality of data stores.

15. The one or more non-transitory computer-readable media of claim 12, having additional instructions stored thereon that, when executed by the computing platform, cause the computing platform to:

identify a portion of the plurality of data stores, each data store of the portion of the plurality data stores being associated with a set of values corresponding to the aspect of edges of the graph database that fails to include a value within the specified set of values; and exclude the portion of the plurality of data stores from querying of the graph database.

* * * * *